United States Patent Office 3,453,212
Patented July 1, 1969

3,453,212
BASIC METAL-CONTAINING REACTION PRODUCTS AND METHOD OF MAKING SAME
Casper J. Dorer, Jr., Lyndhurst, Ohio, assignor to The Lubrizol Corporation, Wickliffe, Ohio, a corporation of Ohio
No Drawing. Filed Sept. 20, 1967, Ser. No. 669,285
Int. Cl. C10m 1/10
U.S. Cl. 252—49.7          20 Claims

ABSTRACT OF THE DISCLOSURE

A process comprising contacting acidic materials with basic, carbonated Group II-metal containing complexes of condensation products of an aliphatic aldehyde and alkylene polyamines. The resulting reaction products are novel compositions of matter useful as lubricant and fuel additives and chemical intermediates. A preferred embodiment of the process comprises contacting a basic, carbonated barium containing complex of a condensation product of an N-alkylene diamine with an acidic material such as an inorganic acidic gas or an inorganic acid.

---

This invention relates to a new process and to the resulting novel metal-containing reaction products. Particularly, the invention is concerned with a method for reacting a basic, Group II metal-containing complex of a condensation product of an aliphatic aldehyde and a polyamine with anions derived from acidic materials.

Basic, Group II metal-containing complexes have been available for many years. At first, these complexes were prepared from various organic acids, particularly carboxylic and sulfonic acids as illustrated by U.S. Patent 2,616,905. More recently it has been found that various other organic compounds can be converted to basic, Group II metal-containing complexes. For example, U.S. Patent 2,989,463 illustrates the preparation of such complexes from alcohols, sulfoxides, amine-aldehyde condensation products and the like.

These prior art basic complexes generally have been employed as additives for various lubricants. When used as an additive in a crankcase lubricant for internal combustion engines, they function effectively as detergents. Due to their high basic metal content, these complexes neutralize acidic contaminants formed during operation of the engine. This acid-neutralizing capability reduces the corrosive wear of the metal engine components. Moreover, as disclosed in 2,989,463, some of these basic complexes are capable of reducing or eliminating the "squawk" in automatic transmissions. Thus, the prior art discloses many used for basic, Group II metal-containing complexes, particularly in the field of lubricants.

According to the process of the present invention, members of a particular group of Group II metal-containing complexes are reacted with the anions of acidic materials to produce novel compositions which retain the detergent properties, acid-neutralizing capabilities, oil-solubility, and other desirable properties of the basic starting material. However, as a result of the process, the chemical composition of the reaction product is changed since at least a portion of the anionic reactants are introduced into the product. These anions can be selected so as to impart additional desirable properties to the compositions produced as reaction products.

The particular group of basic complexes used as starting materials according to the process of the invention are the basic, carbonated Group II metal-containing complexes formed from the condensation products of lower aliphatic aldehydes and polyamines. Such complexes are exemplified in Patent 2,989,463 which is incorporated herein by reference for its discussion of the preparation of these basic complexes.

In accordance with the foregoing, it is a principal object of the present invention to provide novel processes.

Another object is to provide new compositions of matter.

A further object is to provide a process for altering the chemical composition of certain Group II metal-containing complexes by reacting the complexes with anions derived from acidic materials.

A still further object is to provide novel basic Group II metal-containing compositions prepared by reacting (A) basic Group II metal-containing complexes formed from the condensation products of lower aliphatic aldehydes and polyamines with (B) anions derived from acidic materials.

These and other objects of the invention are accomplished by a process comprising contacting anions of at least one acidic material with at least one basic, carbonated, Group II metal-containing complex of a condensation product of a lower aliphatic aldehyde and a polyamine for a period of time sufficient for at least a portion of the anions to react with Group II metal.

The basic amine-aldehyde condensation products used as starting materials are prepared by carbonating a mixture of (1) one or more amine-aldehyde condensation products, (2) at least one phenolic promoter, and (3) a basically reacting Group II metal compound until the ratio of equivalents of Group II metal in the complex exceeds the stoichiometric amount of metal which would be present assuming one equivalent of metal reacts with one equivalent of phenolic promoter. In other words, the basic complexes employed as starting materials contain Group II metal in stoichiometric excess of that required to react with the phenol present according to the normal stoichiometry of the phenols and Group II metals. These basic complexes have also been referred to in the art as "superbased" or "hyperbased" complexes or salts; complex salts, basic metal complexes, "high-metal containing" salts or complexes, basic complex salts, and the like.

By preparing the starting materials as indicated above, the Group II metal-containing product thus produced will contain an amount of metal in excess of that required to neutralize the phenol, for example, 3.5 times as much metal as present in a normal metal phenate or a metal excess of 2.5 equivalents. The actual stoichiometric excess of metal can vary considerably, for example, from about 0.1 equivalent to about 20 or more equivalents depending on the particular phenolic promoters employed, the particular amine-aldehyde condensation products, and the reaction conditions. The over-based complexes useful in preparing the products of the present invention will contain at least about 1.1 equivalents of metal for each equivalent of phenol present.

The terminology "metal ratio" is used in the prior art and herein to designate the ratio of the total chemical equivalents of the metal in the basic complex to the chemical equivalent of metal in the product which would be expected to result in the reaction between the phenolic material and the Group II metal base according to the known chemical reactivity and stoichiometry of the two reactants. Thus, in a "normal" metal phenate, the metal ratio is 1 and in the overbased phenate discussed above, the metal ratio is 3.5.

In the present specification and claims, the terms "basic" and "overbased" are used to designate materials containing a stoichiometric excess of metal and, are therefore, inclusive of materials which have been referred to in the prior art as basic, overbased, superbased, hyperbased, etc., complexes, salts, and complex salts as discussed supra.

The amine-aldehyde condensation products from which the basic complexes are prepared can be readily synthesized. The condensation products can be prepared by reacting from about 0.5 to about 5 moles of lower aliphatic aldehyde with one mole of polyamine at a temperature from about 50° C. to about 240° C. or higher. The upper limit for the reaction temperature is the decomposition temperature of the reactants and products. The lower aliphatic aldehydes are those having up to six carbon atoms therein. Examples of these aldehyde reactants are formaldehyde (or formaldehyde producing compositions such as paraformaldehyde or aqueous formalin), acetaldehyde, propionaldehyde, butyraldehyde, acrolein, and crotonaldehyde, and the like. The most preferred aldehyde reactant is formaldehyde or a formaldehyde producing material such as paraformaldehyde, aqueous formalin, etc. Where the amine or the aldehyde is a solid, the condensation reaction is preferably carried out in the presence of a diluent such as mineral oil, kerosene, xylene, benzene, naphthas, chlorobenzene, liquid alkanes, and other substantially inert solvents. The condensation is promoted by the presence in the reaction mixture of small amounts (at least about 0.01% and usually less than 10% by weight based on the weight of aldehyde) of a basic catalyst such as an alkali metal hydroxide or an alkaline earth metal hydroxide, e.g., sodium hydroxide, potassium hydroxide, calcium hydroxide, or barium hydroxide. The precise structure of the amine-aldehyde condensation products is not known. A preferred group of condensation products is prepared from a mixture of from about 2 to about 4 moles of formaldehyde or a formaldehyde producing compound per mole of the polyamine.

The polyamines from which the aldehyde-amine condensation products are prepared are the alkylene polyamines corresponding to the formula

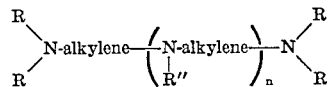

wherein the R's and R" are acyclic, cyclic, or aromatic hydrocarbons or substituted hydrocarbon groups, $n$ is 0 to about 8, at least one of R and R" being hydrogen, R" can also be the group

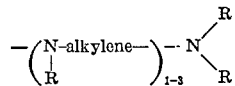

The alkylene radicals have from 1 to 8 carbon atoms, preferably 2–8 carbon atoms, and can be straight or branched chain alkylenes, e.g.,

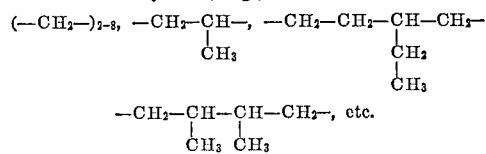

Preferably, the alkylene group has 2 to 4 carbon atoms, e.g.,

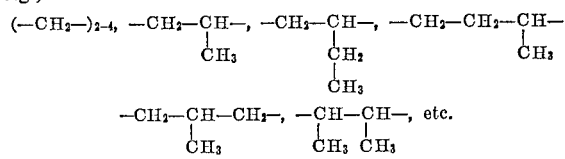

Illustrative of the acyclic, cyclic, and aromatic groups which R and R" represent are alkyl, alkenyl, cycloakyl, cycloalkenyl, cycloalkyalkyl, cycloalkylalkenyl, cycloalkenylalkenyl and aryl hydrocarbon groups having up to about 10 nuclear carbons. These groups each can contain up to about 40 carbon atoms each. In addition, these various groups may have nonhydrocarbon substituents such as hydroxy, halo, amino, nitro, alkoxy, alkylmercapto, alkyl, and the like. Likewise, the acyclic aliphatic groups can contain sulfur and/or oxygen as interrupting groups, i.e., —S— or —O—.

A preferred subclass of amines corresponded to the formula

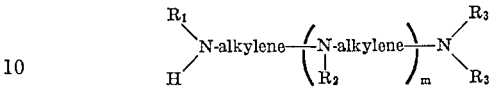

wherein $R_1$, $R_2$, and $R_3$ are hydrogen or acyclic aliphatic hydrocarbon radicals containing from about 8 to about 40 carbon atoms, at least one of these radicals being other than hydrogen, M is 0 to 8, and the alkylene groups contain 2 to 4 carbon atoms each. Generally, $R_2$ and at least one $R_3$ are hydrogens. An especially suitable class of amines are the diamines wherein $R_1$ is an alkyl of 8 to 40 carbon atoms, preferably 12 to 30 carbon atoms, $R_2$ and $R_3$ are hydrogens, and M is 0.

Typical amines falling within the foregoing formulae are N-octadecyl propylenediamine, N-octyl ethyenediamine, N-ethyl butylenediamine, N-(4-ethoxycyclohexylbutyl) - ethylenediamine, N,N'-di(decyl) - propylenediamine, N-dodecyl propylenediamine, N-octyl-N-ethyl butylenediamine, N-allyl - N' - nonyl - ethylenediamine, N-(4-phenylhexyl)-N'-isobutyl propylene diamine, 1-dodecyl triethylene-tetramine, N-dotracontyl ethylenediamine, N-docosyl propylene diamine, N-eicosyl-1,2-butanediamine, 1,7-di(decyl)diethylenetriamine, N-propyl octamethylenediamine, ethylenediamine, dipropylenetriamine, pentaethylenehexamine, N-octyl octamethylenediamine, 1-cyclohexyl triethylene tetramine, 3-aminoethyldiethylenetriamine, N,N-di(ethoxybutyl)-butylenediamine, and the like.

The metal compounds used in preparing the overbased amine-aldehyde condensation products are normally the basic salts of metals in Group II of the Periodic Table. The anionic portion of the salt can be hydroxyl, oxide, carbonate, hydrogen carbonate, nitrate, sulfite, hydrogen sulfite, halide, amide, sulfate, etc. as disclosed in the above-cited patents. The overbased products are preferably prepared from the alkaline earth metal oxides, hydroxides, and alcoholates. The alkaline earth metal lower alkoxides are the preferred alcoholates.

A particularly comprehensive discussion of suitable promoters is found in 2,777,874; 2,695,910; and 2,616,904. These include the alcoholic and phenolic promoters which are preferred. The alcoholic promoters include the alkanols of one to about twelve carbon atoms such as methanol, ethanol, amyl alcohol, octanol, isopropanol, and mixtures of these, and the like. Phenolic promoters are preferred for overbasing amine-aldehyde condensation products. They include a variety of alkylated mono- or poly-hydroxy-substituted benzenes and naphthalenes. A particularly useful class of phenols are the mono- and di-alkylated phenols in which the alkyl substituent contains from about 6 to about 200 carbon atoms. Illustrative of such phenolic promoters are the heptylphenols, octylphenols, dodecylphenols, nonylphenols, polypropene (M.W. of 150)-substituted phenol, polyisobutene (M.W. of 350)-substituted phenols, cyclohexyl phenol, behenyl phenol. Mixtures of the various promoters are also useful. Water is sometimes used in combination with the promoters to facilitate the reaction.

Suitable acidic materials are also disclosed in the above cited patents, for example, 2,616,904. The overbased products used as starting materials are usually prepared using inorganic acidic materials such as HCl, $SO_2$, $SO_3$, $CO_2$, $H_2S$, $N_2O_3$, etc. The overbased amine-aldehyde condensation products prepared with $CO_2$ (i.e., carbonated products) are preferred as starting materials in the present invention. Materials capable of producing the acidic reactants in situ may also be used. For example, urea, carbamates, and ammonium carbonates produce $CO_2$ in situ.

In preparing the overbased products, the amine-aldehyde condensation product, a substantially inert organic diluent, a metal base, the promoter, and the acidic material are brought together and a chemical reaction ensues. The exact nature of the resulting overbased product is not known. However, it can be adequately described for purposes of the present specification as a single phase homogeneous solution of a Group II metal-containing complex formed from the metal base, the acidic material, and the amine-aldehyde condensate. Since many of these overbased starting materials are old in the art and as they are used merely as intermediates, the exact nature thereof is not critical to an understanding of the present invention.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 250° C. When an alcohol or mercaptan is used as the promoting agent, the temperature usually will not exceed the reflux temperature of the reaction mixture and preferably will not exceed about 100° C.

A typical preparation of an overbased amine-aldehyde condensation product would involve mixing a phenolic promoter, a Group II metal base, and the organic compound to be overbased and treating the mixture with carbon dioxide at a temperature of at least about 50° C., preferably from 80° C. to 250° C. The upper temperature limit is determined by the decomposition point of the reaction mixture. The carbonation is preferably carried out in the presence of a fluid diluent, usually an organic solvent in which the organic reactants and the product are soluble. For purposes of this invention, mineral oil and combinations of at least 50% by weight mineral oil and one or more other inert organic diluents are preferred. The amount and type of diluent employed should be selected so that the inert diluent in the reaction product comprises from about 30% to about 90% by weight thereof.

The relative amounts of phenolic promoter to amine-aldehyde condensation product in the reaction mixture can vary from about 0.1 to 10 equivalents of phenol per equivalent of the condensation product. In most instances, the mixture contains from about 0.2 to about 5 equivalents of phenolic promoter to each equivalent of the condensation product.

The amount of the metal base used in the overbasing reaction is usually such that the ratio of equivalents of Group II metal to total equivalents of phenolic promoter and condensation product is at least about 1.1:1. There appears to be no upper limit on the amount of basically reacting metal compound which may be used in the process. For practical reasons, however, the amount of metal base seldom exceeds a ratio of equivalents of 25:1 or 30:1. A greater amount of metal may be used but there appears to be no practical advantage attending such use. Normally, the ratio of equivalents is from about 2:1 to about 15:1. The overbased condensates preferably have a metal ratio of at least about 2 up to about 25, although products having higher metal ratios can be used.

The equivalent weight of the promoter and the amine-aldehyde condensation product depends upon the number of functional groups in the molecule and the equivalent weight of the basically reacting metal compound depends upon the valence of the metal and the number of the metal radicals in the molecule. Thus, the equivalent weight of a phenol is determined by the number of hydroxy radicals attached to the aromatic nucleus; and the equivalent weight of the condensation product of an amine and a lower aldehyde is determined by the number of the amino nitrogen radicals in the molecule. For instance, the equivalent weight of heptylphenol is its molecular weight; that of 2,2′-didecyl-4,4′-methylenebisphenol is one-half its molecular weight; that of the condensation product of N-alkyl tetraethylene pentamine and an aldehyde is one-fifth its molecular weight; and that of an alkaline earth metal oxide or hydroxide is one-half its molecular weight.

When the reaction mixture is contacted with the acidic material, either in the presence of or in the absence of a diluent, it is usually a heterogeneous mixture. As acidification (e.g., carbonation) proceeds, the metal base becomes solubilized in the organic phase and the carbonated product eventually becomes a homogeneous composition which is readily soluble in hydrocarbon solvents such as benzene, xylene or mineral oil. It is not necessary that all of the metal base present in the process mixture should be so converted in order to produce a soluble homogeneous product. Such a product is often obtained, for example, when as little as 75% of the metal base is carbonated.

As mentioned before, the overbased amine-aldehyde condensation product is prepared in a substantially inert organic liquid medium, usually a mineral oil-containing medium. Thus, the overbased starting materials are normally mineral oil solutions of the overbased products although the overbased products can be made in many other organic solvents including aromatic hydrocarbons and halohydrocarbons such as benzene, toluene, xylene, chlorobenzenes; lower boiling petroleum distillates such as kerosene and the various naphthas; the normally liquid aliphatic hydrocarbons and halohydrocarbons such as hexane, heptane, hexene, chlorohexane, and the like. These solvents are used alone or in combination with mineral oil or other natural or synthetic oils when a combination of oil and one or more of the other solvents is used, the weight ratio of oil to other solvent is generally 1:20 to 20:1. The solutions of the overbased products in any of these solvents can be used in the present process as prepared. Obviously, the amount of solvent can be decreased or increased as desired to facilitate mixing, or to meet some particular requirement for the composition to be prepared, and the like. The solvent serves as a reaction medium when the overbased materials are used in the process of the present invention.

The following examples illustrate the preparation of basic amine-aldehyde condensation products useful as starting materials in the present invention. Unless otherwise indicated, all percentages and parts are expressed as percent or parts by weight.

EXAMPLE 1

An amine-aldehyde condensation product is obtained as follows: Four hundred-twenty grams of formaldehyde (14 moles) are added in small increments to a mixture of 1392 grams of N-octadecyl propylenediamine (4 moles), 3000 grams of mineral oil, 200 grams of water, and 42 grams of calcium hydroxide (42 grams, condensation catalyst) at the reflux temperature of 100–105° C. The rate of addition of formaldehyde is such as to avoid excessive foaming. The mixture is heated at the reflux temperature for one hour, then slowly heated to 155° C., and blown with nitrogen at 150°–155° C. for two hours to remove all volatile components. The mixture is then filtered. The filtrate, 93% of the theoretical yield, is a 65.4% oil solution of the amine-aldehyde condensation product having a nitrogen content of 2.4%.

An 1850 gram portion (3.2 equivalents of nitrogen) of the above product is mixed with 185 grams of heptylphenol (0.97 equivalent), 145 grams of mineral oil, and 1060 grams of 90% pure barium oxide (12.6 equivalents) and heated to 70° C. Then 500 grams of water is added over a one-hour period while maintaining the temperature at 70°–100° C. The mixture is then heated at 110°–115° C. for 4.75 hours. Thereafter, it is carbonated at 140°–150° C. and filtered. The filtrate is a 57.8% oil solution of the basic Group II metal-containing amine-aldehyde condensation product and is characterized by a nitrogen content of 0.87% and a sulfate ash content of 29.5%.

EXAMPLE 2

A product similar to that of Example 1 but with a lower mineral oil content is made by mixing 1000 parts of N-octadecyl propylenediamine, 490 parts of mineral oil, 32 parts calcium oxide, and 143 parts of water at about 44° C. and then slowly heating this mixture to about 102° C. under reflux conditions over a one-hour period. While maintaining the mxture at 100°–105° C., 303 parts of paraformaldehyde are added over three hours. Mixing is continued for another hour under the same conditions and then the mass is heated to about 150° C. over a 2.5 hour period. Two hundred and seventy eight parts of distillate are removed and the residue filtered.

In a separate reaction vessel, a mixture of 197 parts mineral oil and 119 parts of heptylphenol is heated to 93–99° C. While maintaining this temperature, 465 parts of barium hydroxide monohydrate is added over a four-hour period. The temperature is then elevated to about 150° C. and 149 parts of the above oil-solution of amine-formaldehyde condensation product is introduced over a one-half hour period. Carbon dioxide is introduced into the mixture via submerged line at 15 parts per hour for seven hours during which the temperature is maintained at about 150° C. An additional 100 parts of mineral oil is added and this reaction mixture is blown with nitrogen for two hours during which the temperature is regulated at about 150° C. This reduces the water content of the mixture to about 0.3%. The reaction mixture is then filtered. The filtrate is an oil solution of amine-formaldehyde condensation product containing about 36% by weight mineral oil and having a barium content of about 30.8%.

EXAMPLE 3

A mixture comprising 1400 grams of a 65.4% mineral oil solution of an amine-aldehyde condensation product prepared as in Example 2, 281 grams of heptylphenol (1.46 equivalents), 1636 grams of mineral oil, and 893 grams of barium oxide (11.6 equivalents) is heated to 70° C. Five hundred grams of water is added over one hour at 70°–110° C. The mixture is heated to reflux temperature (110°–115° C.) for four hours and dried by heating at 145°–150° C. for 0.5 hour. It is blown with carbon dioxide at 145°–150° C. until it is substantially neutral to phenolphthalein and then filtered. The filtrate is a 58% oil solution of the product and has a barium sulfate ash content of 27.3%.

EXAMPLE 4

A mixture comprising 1367 parts mineral oil, 633 parts N-octadecyl propylenediamine, 20 parts calcium hydroxide, and 91 parts water is heated to about 40° C. To this mixture there is added 192 parts of formaldehyde preheated to about 102° C. The resulting mixture is then maintained at about 100° C. for a period of one hour and thereafter heated to about 153° C. over a 2.8 hour period. An additional 2075 parts of oil are added and 825 parts of heptylphenol is introduced into the mixture over a two hour period. To this mixture, there is added 3240 parts of barium hydroxide monohydrate over a five hour period during which time the mass is maintained at a temperature of about 140°–155° C. The mixture is then blown with carbon dioxide via a submerged line at the rate of about 100 lbs. per hour for eight hours while maintaining the temperature at about 148°–163° C. The carbonation is stopped and then the entire reaction mass is blown with nitrogen gas via a submerged line at the rate of 25 parts per hour for four hours. During nitrogen blowing, the temperature of the mass is 150°–160° C. The resulting mixture is then filtered. The filtrate is an oil solution of the desired product and contains 49% oil, 23.5% barium, and has a sulfate ash content of 39.3%.

EXAMPLE 5

The procedure of Example 1 is repeated substituting an equimolar amount of 1-dodecyl diethylene triamine for N-octadecyl propylenediamine.

EXAMPLE 6

The procedure of Example 3 is repeated substituting 50% oil solution of the condensation product of one mole of N-dodecyl butylenediamine and two moles of formaldehyde for the condensation product utilized in Example 3.

EXAMPLE 7

The procedure of Example 1 is repeated substituting an equimolar amount of acetaldehyde for the formaldehyde employed therein.

Obviously, other overbased amine-aldehyde condensation products can be prepared readily merely by replacing all or a portion of the amines of the foregoing illustrative examples with one or more of the other alkylene polyamines described hereinbefore. As explained supra and as demonstrated above, the procedure for preparing the basic, carbonated amine-aldehyde condensation products is not complicated and, furthermore, has been described in the prior art. Since the preparation of these basic products is clearly within the skill of the art and as the basic products are used only as intermediates in the present invention, further discussion thereof herein is inappropriate.

Overbased amine-aldehyde condensation products of the type described above are employed as starting materials in the process of this invention as discussed below. Thus, the overbased condensation products are contacted with the anions of an acidic material for a period of time sufficient for at least a portion of the anions to react with Group II metal present in the overbased reactant.

In preparing these novel reaction products, the organic liquid solution produced in the preparation of the overbased Group II metal-containing reactant and the anions are reacted in amounts such that the ratio of equivalents of Group II metal in the overbased reactant to equivalents of anion (an equivalent of an anion is its weight divided by its valence) in the reaction mixture is about 1:0.01 to about 1:5 and preferably 1:0.1 to 1:3. It is not essential that all the anions present actually react and become a part of the complex but the reaction should continue until at least a portion of the anions react with Group II metal. The equivalent ratio of Group II metal to the anions in the reaction products can vary from about 1:0.01 to about 1:3 and usually from about 1:0.1 to about 1:1.5. Products wherein this ratio is about 1:0.2 to about 1:1 have been found to be particularly useful as detergents in lubricants, smoke suppressants, in diesel fuels and the like.

The temperature at which the solution of the overbased product and anions are contacted is not a particularly critical factor in the process. However, a temperature of at least about 20° C. should be employed to avoid an unduly slow reaction and to facilitate mixing, especially where mineral oil or other viscous liquid is used as a reaction medium. The upper temperature is limited only by the decomposition temperature of the reactants and the products. However, when the acidic anions are employed in solution, e.g., aqueous solutions, it may be desirable not to exceed the boiling point of the solvent during the reaction to reduce the solvent loss. Of course, higher temperatures can be employed conveniently in conjunction with superatmospheric pressure or reflux conditions to avoid solvent loss. Obviously, the reaction will proceed even as solvent is lost so solvent conservation is not critical. Reaction temperatures of about 20° C. to about 150° C. are typical and a temperature of about 40° C. to about 95° C. usually provides very good results.

When the reaction has proceeded to a desired point, the reaction mass may be filtered and water and other undesired liquids can be readily removed or their amounts reduced as desired by increasing the temperature of the reaction mass and/or lowering the pressure. Normally, water is removed from the reaction product.

The acidic anions used in the process of the present invention are derived from acidic materials corresponding to the formula $$C_a^{(+)b'}E_b^{(-)a'}$$

where C and E are the cations and anions, respectively. Obviously, $a \cdot b' = b \cdot a'$ where $a$ and $b$ represent the number of each ion present in the material and $a'$ and $b'$ represent their valences.

The identity of the cation is not particularly critical except to the extent that it influences the solubility of the acidic material. As illustrated hereinafter, the present reaction is usually carried out by forming a solution of the anions and reacting this solution with the overbased starting material. Thus those cations which contribute to greater solubility are preferred. It is a matter of choice as to whether the anion solution is preformed or prepared in situ. Normally, water is used as a solvent for the acidic material which furnishes the anions, although any substantially inert solvent for these materials is suitable. The cation is preferably $NH_4^+$ or $H^+$ but can also be a metal or an amine cation. Thus, the anions are usually derived from inorganic acids per se, as well as the ammonium, amine, and metal salts thereof. Of the metal salts, the alkali metal salts usually are employed since they are generally water-soluble and most economical. However, other metal salts may be utilized. The $NH_4^+$ or $H^+$ cations are preferred since they are normally converted into ammonia gas and water during the reaction. These by-products are readily removed whereas some of the amine and metal cations may form insoluble precipitates which require filtration in order to remove them from the final product.

Similarly, the identity of the anion is not critical insofar as the operability of the process is concerned, although the properties of the final product are influenced thereby. For example, when the anion is a molybdenum-containing anion such as $Mo_7O_{24}^{6-}$, the product imparts extreme pressure and antiwear properties to lubricating compositions in addition to detergent properties. Though the process is operative with organic anions, i.e., the anions of organic acids, it is particularly suitable for use with anions of inorganc acids, preferably the anions of inorganic oxy acids and their corresponding ammonium, amine, and metal salts. Of these, the polyvalent oxy acid anions are especially suitable. The protonic binary acids, such as the hydrohalic acids, are also useful.

It will be understood by those skilled in the art that the anions of acids which are not known to exist as such can be employed in the form of their various salts. For example, molybdic acid ($H_2MoO_4$) and tungstic acid ($H_2WO_4$) are not known to exist as such. However, the anions of these acids can be used in the present process by employing the corresponding ammonium, alkali metal, magnesium, or thallous salts. In addition, the various isopoly and heteropoly inorganic acid anions are also suitable for use in the present process. The isopoly molybdates such as the paramolybdates are illustrative of the anions derived from isopoly acids while the heteropoly tungstates and molybdates illustrate the heteropoly acid anions.

These various anions are derived from acidic materials well known in the art and an extensive discussion thereof can be found in standard chemical tests. See for example, F. A. Cotton and G. Wilkinson, Advanced Inorganic Chemistry, pages 134 through 141, 185–188, 260–265, 394–403, 423–437, 779–790, etc., published by Interscience Publishers, New York, 1962.

Typical acidic materials suitable for providing the anions useful in the present invention include $H_2SO_4$, $NH_4NO_2$, $NH_4HB_4O_7$, $H_3PO_4$, $(NH_4)_2HPO_4$, $(NH_4)_2CrO_4$, $(NH_4)_2S_2O_3$, $(NH_4)_2SO_4$, $(NH_4)_6Mo_7O_{24}$ $AlNa(SO_4)_2 \cdot 12H_2O$ (Alum), and the like. Acidic inorganic gases which can be employed include $SO_2$ and $SO_3$. When the gases are employed they are merely bubbled through the reaction mixture or aqueous solutions thereof can be used.

The metal-containing compositions of the invention are complexes which broadly correspond to the empirical formula $R^xM^nA^yE^z$. In this formula R represents an equivalent of an organic hydrophobic group (generally an oleophilic group), M represents an equivalent of a Group II metal, A represents an equivalent of an anion of an inorganic acid, E is an equivalent of the inorganic acid anion which is reacted with the overbased starting material. The superscripts $x$, $n$, $y$, and $z$ represent the number of equivalents of R, M, A, and E present in the complex. The ratio of $n:x$ is at least 2:1, $n$ is at least 2, $x$ and $z$ each are at least 1, and $n$ equals $x+y+z$ with the proviso that $y$ can be 0.

Having discussed the intermediates from which the metal-containing compositions of the invention are prepared, it is now possible to more specifically identify the variables forming the complex. Thus, in the formula $R^xM^nA^yE^z$, R is an equivalent to the oil-soluble organic compoud which is overbased to produce the basic starting material, e.g., an equivalent of alkylphenol or amine aldehyde condensation product. The identity of A depends upon the acidic material used in the overbasing process. For example, if carbon dioxide is used as the acidic material, 2 equivalents of A correspond to the group $$-O-\overset{\overset{\displaystyle O}{\|}}{C}-O-$$

Obviously, the identity of E depends on the particular anion used as an intermediate in the process. Thus, two equivalents of E could correspond to the groups $SO_4^=$, $MoO_4^=$, $WO_4^=$, etc.

Accordingly, the novel Group II metal-containing reaction products of the present invention can be characterized as compositions comprising (a) an inert organic liquid diluent and (b) a Group II metal-containing complex corresponding to the formula $R^xM^nA^yE^z$ wherein R, M, A, E, $x$, $n$, $y$, and $z$ are as defined above. Obviously, the amount of inert diluent can be varied as desired. Usually, however, it will comprise from at least about 20% to about 90% by weight of the composition, the remainder of the compositions being a complex defined by the above formula. In preferred aspects of the invention mentioned supra, R may represent an equivalent of either (1) an equivalent of an alkylated phenol wherein the alkyl groups contain from about 6 to about 200 carbon atoms or (2) an equivalent of an N-alkyl alkylenediamine, M is an equivalent of barium, A is an equivalent of $CO_2^=$, and E is an equivalent of an anion of an inorganic protonic oxy acid.

The following examples illustrate the process and reaction products of the present invention.

EXAMPLE I

An aqueous mixture of ammonium paramolybdate tetrahydrate, $(NH_4)_6Mo_7O_{24} \cdot 4H_2O$, is prepared by mixing 411 grams thereof with 300 grams of water and maintaining the temperature at about 60° C. Four 100-gram portions of this mixture are added to 457 grams of the basic barium-containing amine-aldehyde condensate of Example 2 over a 3.5 hour period while maintaining the temperature of the reaction mass at about 95° C. During the addition of the aqueous mixture, ammonia and carbon dioxide are evolved. The reaction mass is dried by heating to 150° C. while blowing with nitrogen and thereafter filtered yielding 550 grams of an oil solution of the desired reaction product. Analysis of the product establishes that about 65% of the molybdenum employed in the reaction in the form of molybdate anions is retained in the resulting reaction product.

EXAMPLE II

A mixture of 2751 grams of the basic amine-formaldehyde condensation product of Example 4 and 27 grams of water are heated to 150° C. and blown with nitrogen. The nitrogen blowing is discontinued and $SO_2$ gas in introduced into the mixture at the rate of two cubic feet per hour while maintaining the temperature at about 150° C. for two hours. The product is then blown with nitrogen gas for about one hour. Thereafter, 750 grams of the reaction mixture are removed and filtered. The filtrate has a sulfur content of 1.35% and a barium sulfate ash content of 39.1%. $SO_2$ gas is again introduced into the remaining portion of the reaction mixture at the rate of two cubic feet per hour for an additional two hours at a temperature of about 150–155° C. Subsequently, the $SO_2$ addition is stopped and the reaction mixture is blown with nitrogen gas and filtered. This second filtrate weighs 1898 grams and has a sulfur content of 2.58% and an ash content of about 39.1%.

EXAMPLE III (A) An oil solution of a basic amine-aldehyde condensation product is prepared as in Example 2 and adjusted (by addition of mineral oil) to a barium metal content of 30% or a barium sulfate ash content of 51%. Seven hundred and four grams of aqueous sulfuric acid previously prepared by mixing 184 grams of 96% sulfuric acid with 520 grams of water are added to 816 grams of the oil solution over a one-hour period. The temperature during the addition of the sulfuric acid is maintained in the range of about 25°–38° C. Carbon dioxide is constantly evolved during this acid addition. The mixture is then blown with nitrogen gas at 150° C. for four hours to remove water and carbon dioxide and subsequently filtered. The filtrate had a barium sulfate ash content of 46%, a sulfur content of 6.37%, a carbon dioxide content of 0.33%, and a nitrogen content of 0.55%.

(B) The general procedure of (A) above is followed except that 368 grams of 50% aqueous sulfuric acid is substituted for the sulfuric acid used in (A). The acid is added over a 0.5 hour period while maintaining a reaction temperature of 25°–63° C. After blowing with nitrogen at 150° C. to remove carbon dioxide and water the reaction mixture is filtered. The filtrate has a barium sulfate ash content of 45.6%, a nitrogen content of 0.56%, and a sulfur content of 6.25%.

(C) A mixture is formed comprising 402 grams of the product of Example 2 above and 386 grams of an aqueous solution of sodium hydrogen sulfate (prepared by dissolving 243 grams of sodium hydrogen sulfate monohydrate in 143 grams of water). The mixing results in an exothermic reaction which brings the temperature of the mass to 70° C. The reaction is accompanied by some foaming. Subsequently, 130 grams of toluene is added so that the water can be azeotropically removed. The mixture is then heated to 90° C. to remove the water and filtered. Filtration removes a white crystalline which formed during the reaction. The toluene is stripped from the filtrate producing 431 grams of reaction product having a sulfate ash content of 46.6% and a sodium content of 0.28%.

(D) Ammonium hydrogen sulfate is reacted with 345 grams of the product of Example 2 above by mixing the basic amine-aldehyde condensation product with 172 grams of a 50% aqueous solution of ammonium hydrogen sulfate while maintaining the reaction mixture at a temperature of about 60° C. The aqueous solution of the ammonium hydrogen sulfate is added over a 0.5 hour period during which both ammonia and carbon dioxide are evolved. The reaction mass is then heated to 100°–150° C. for a 2.5 hour period while blowing with nitrogen and filtered. The filtrate has a nitrogen content of 0.65%, a sulfate ash content of 46%, and a sulfur content of 6.10%.

(E) A mixture of 690 grams of the product of Example 2 and 200 grams of a solid ammonium sulfate are placed in a reaction flask. One hundred milliliters of water are added to the mixture over a 1.5-hour period resulting in a steady evolution of carbon and ammonia. During this addition, the temperature of the reaction mixture is maintained at 90° C. An additional 100 milliliters of water are added under the same conditions. Subsequently, the reaction mixture is blown with nitrogen while maintaining a temperature of 150° C. The reaction mixture is then filtered. The filtrate has a sulfate ash content of 42%, a sulfur content of 6.16%, and a nitrogen content of 0.638%.

The procedure of (A) through (E) can be repeated substituting kerosene, toluene, hexane, or other similar hydrocarbon liquid in which the basic amine-aldehyde condensation product is soluble for all or a portion of the mineral oil. This is accomplished by substituting the additional solvent for the mineral oil or portion thereof in the preparation of the basic amine-aldehyde condensate. An additional liquid can be added before or during the reaction with the anions.

EXAMPLE IV

Sulfamic acid is reacted with a basic amine-aldehyde condensation product by adding 172 grams of solid sulfamic acid to 400 grams of the filtrate of Example 2 at room temperature. The temperature of the mass rose to 60° C. and carbon dioxide was evolved constantly during the one-hour addition period. Thereafter, the reaction mass is heated to about 155° C. and blown with nitrogen for about 2.5 hours. The product had a sulfate ash content of 39.2%, a nitrogen content of 5.9%, and a carbon dioxide content of 0.15%.

EXAMPLE V

An aqueous mixture consisting of 148 grams of $(NH_4)_2S_2O_3$ and 150 grams of water is added to 457 grams of the reaction product of Example 2 over a 0.25 hour period. The addition of the aqueous mixture is accompanied by the evolution of carbon dioxide and ammonia. The reaction mixture is then heated within the range of 100°–150° C. while blowing with nitrogen to remove water, carbon dioxide, and ammonia and filtered. The filtrate has a barium content of 26.08%, a nitrogen content of 0.99%, a sulfur content of 12.07%, and a sulfate ash content of 45.4%.

EXAMPLE VI (A) Following the general procedure of Example V, 634 grams of 85% phosphoric acid are reacted with 2500 grams of the basic amine-aldehyde condensation product of Example 2. The reaction product has a sulfate ash content of 46.2%, a carbon dioxide content of 0.55%, a nitrogent content of 0.61%, a phosphorus content of 5.6%, and a barium content of 17.39%.

(B) An aqueous solution of ammonium hydrogen phosphate is prepared by mixing 297 grams of $(NH_4)_2HPO_4$ and 300 grams of water. The solution is then added to 1400 grams of the product of Example 2 during which an exothermic reaction ensues and the temperature of the mixture rises from 25° to 67° C. Carbon dioxide and ammonia are constantly evolved during the addition. The reaction mixture is then heated to 155° C. while blowing with nitrogen and subsequently filtered. The reaction product has a barium sulfate ash content of 46%, a phosphorus content of 4.02%, a nitrogen content of 0.6%, a carbon dioxide content of 3.16%.

(C) A 50% aqueous mixture of ammonium dihydrogen phosphate, $NH_4H_2PO_4$, is prepared by mixing 129 grams of the phosphate with 129 grams of water. This mixture is slowly added to 457 grams of the product of Example 2 over a 0.5 hour period. The reaction is slightly exothermic and carbon dioxide and ammonia are evolved as a temperature of the reaction mass is raised from room temperature to 75° C. Thereafter, the product is heated to 150° C. and blown with nitrogen over a 2.5-hour period. The reaction mixture is then filtered. The resulting product has a phosphorus content of 5.96%, a barium content of 26.29%, a nitrogen content of 0.65%, a carbon dioxide content of 0.96%, and a sulfate ash content of about 48%.

EXAMPLE VII

A solution of $(NH_4)_2CrO_4$ is prepared by mixing 76 grams of the anhydrous chromate crystals with 20 milliliters of water at 30° C. The resulting solution is added to 228 grams of the filtrate of Example 2. The temperature of the reaction mixture rises to 80° C. and carbon dioxide is evolved. Thereafter, the mixture is heated to 150° C. while blowing with nitrogen and subsequently filtered. The product has a sulfate ash content of 54%, a carbon dioxide content of 3.8%, and a chromium content of 5.68%.

EXAMPLE VIII

A mixture comprising 457 grams of the filtrate of Example 2, 228.4 grams of $NH_4HB_4O_7 \cdot 3 H_2O$, and 50 grams of water is heated to 80° C. during which time carbon dioxide and ammonia are evolved. The product is then heated to 150° C. and blown with nitrogen. The product has a boron content of 5.53%, a nitrogen content of 0.569%, a barium content of 21.66%, and a carbon dioxide content of 2.03%.

EXAMPLE IX

Five hundred grams of the filtrate of Example 2 are heated to about 50° C. To this there are added slowly 500 grams of ammonium alum, $Al_2(SO_4)_3 \cdot (NH_4)_2SO_4 \cdot 24 H_2O$ and 250 grams of water during which the temperature of the mixture is maintained at about 100° C. When carbon dioxide and ammonia evolution cease, the reaction mixture is heated to 150° C. over a 2.5 hour period and filtered. Approximately 250 grams of the ammonium alum are recovered as a residue from the filtration. The product has an aluminum content of 0.41%, a barium content of 27.46%, a sulfur content of 7.32%, a carbon dioxide content of 0.78%, and a sulfate ash content of 47.13%.

EXAMPLE X (A) To 680 grams of the filtrate of Example 2 there are added 1464 grams of diorganophosphorodithioic acid corresponding to the formula $(HeptPhO)_2PSSH$ over a 0.33-hour period while maintaining the temperature at about 25°–35° C. The mixture is then heated to 155° C. while blowing with nitrogen over a two-hour period. Hydrogen sulfide is evolved throughout the reaction. The reaction mass is then filtered. The product is characterized by a barium content of 10%, a phosphorus content of 4.10%, a sulfur content of 7.21%, and a nitrogen content of 0.205%.

(B) Two hundred and thirty-nine grams of the acid of (A) is blown for one hour with ammonia while maintaining a temperature of 28°–42° C. The reaction mixture turns white and becomes more viscous necessitating the addition of 78 grams of xylene. Thereafter, 228 grams of the filtrate of Example 2 are added over a 0.25-hour period while maintaining a temperature of 28°–32° C. The product is then heated to 150° C. and blown with nitrogen. Thereafter, the reaction mixture is heated to 150° C. under a pressure of 1–2 millimeters of mercury and filtered. The product is characterized by a nitrogen content of 0.26%, a sulfur content of 4.48%, a barium content of 10.7%, a phosphorus content of 2.39%, and a sulfate ash content fo 25.7%.

The novel Group II metal-containing products of this invention are effective smoke suppressants in hydrocarbon fuels, particularly diesel fuels. When employed as black smoke suppressing additives in fuels, these products should be utilized in amounts sufficient to provide the fuel with a sulfate ash content of 0.01% to about 10% by weight and preferably from about 0.1% to about 3% by weight.

The effectiveness of the novel Group II metal-containing complexes as smoke suppressants has been established by actual engine test. The black smoke content of the engine exhaust is rated on a scale of 0 to 10, 0 indicating the absence of detectable black smoke. Typical test results are reported below:

(a) The product of Example III(B) is blended with kerosene in a weight ratio of product to kerosene of 49.5:50.5 so that 40 ml. of the blend will impart a sulfate ash content of 0.28% by weight to one gallon of diesel fuel. Diesel fuel treated with this blend in the indicated amounts produces the following smoke suppression ratings:

| Percent by volume of blend in fuels: | Smoke rating |
|---|---|
| 0.00 | 7.13 |
| 0.10 | 7.00 |
| 0.25 | 7.00 |
| 0.50 | 4.50 |
| 1.00 | 3.00 |

(b) The product of Example II is incorporated into a diesel fuel in an amount sufficient to provide the fuel with a sulfate ash content of 0.14% by weight. This fuel produces a smoke rating of 8.5 without the additive and a rating of 6.5 with the additive.

(c) The product of Example VI(B) is blended with diesel fuel in amounts that produce sulfate ash contents of 0.14% and 0.28% by weight. The smoke rating of the fuel without the additive is 8.5 and with the additive, 7.0 and 6.5, respectively.

(d) The product of Example VI(A) is incorporated in a diesel fuel in an amount that produces a sulfate ash content of 0.14% and 0.28%. The smoke rating of the fuel alone is 8.0. With the additive, it is 7.5 and 6.5, respectively.

The other reaction products of the invention described hereinbefore provide similar smoke suppression capabilities to diesel fuels. As is well known, the industry is particularly concerned with the reduction of air pollution associated with the operation of diesel engines, the suppression of the black exhaust smoke being one of the major problems.

As indicated above, the reaction products of the invention are also useful as additives for lubricants. They will usually be employed in amounts about 0.05% to about 20% by weight of the total composition in the manner of other known ash-containing detergents. Normally, they will be employed in concentrations of about 0.1% to about 10% by weight of the composition.

As is typical of other ash-containing detergents known in the art, it is contemplated that the reaction products of the present invention will be employed in combination with other additives such as ashless detergents and dispersants, other ash-containing detergents, viscosity index improving agents, pour point depressants, extreme pressure agents, rust inhibitors, anti-foam agents, anti-wear agents, and the like. These other additives, when present will normally constitute from about 0.1% to about 20% by weight of the composition depending on the nature of the additive and the particular requirements of the lubricant.

Suitable ash-containing detergents for use in conjunction with the present reaction products as additives in lubricating oils are the oil soluble neutral and basic salts of alkali or alkaline earth metal sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosporus pentasulfide, phosphorus trichloride and sulfur, light phosphorus and a sulfurhalide, or phosphorothioic chloride. The most commonly used salts of such acids are those of sodium, potassium, lithium, calcium, magnesium, strontium, and barium.

Extreme pressure agents and corrosion-inhibiting and oxidation-inhibiting agents are exemplified by chlorinated aliphatic hydrocarbons such as chlorinated wax; organic sulfides and polysulfides such as benzyldisulfide, bis-(chlorobenzyl)disulfide, dibutyltetrasulfide; sulfurized sperm oil, sulfurized methyl ester of oleic acid, sulfurized alkylphenol, sulfurized dipentene, and sulfurized terpene, phosphosulfurized hydrocarbons such as the reaction product of a phosphorus sulfide with turpentine or methyloleate; phosphorus esters including principally dihydrocarbon and trihydrocarbon phosphites such as dibutylphosphite, diheptylphosphite, dicyclohexylphosphite, heptylphenylphosphite, dipentylphenylphosphite, tridecylphosphite, distearylphosphite, dimethylnaphthylphosphite, polypropylene(molecular weight 500)-substituted phenylphosphite; metal thiocarbamates such as zinc dioctyl-dithiocarbamate and barium heptylphenyldithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus sulfide and equimolar mixture of isopropyl and n-hexyl alcohols.

The following compositions exemplify lubricating compositions containing the reaction products of the present invention.

Composition A

SAE 10W-30 mineral lubricating oil containing 0.5% by weight of the product of Example VII, 2% of a basic, carbonated barium petrosulfonate, 0.05% of phosphorus as the zinc salt of a phosphorodithioic acid prepared by the reaction of phosphorus pentasulfide with a mixture of 60% (mole) of p-butylphenol and 40% (mole) of n-pentyl alcohol.

Composition B

SAE 10 mineral lubricating oil containing 1.5% of the product of Example I, 0.075% of phosphorus as the adduct obtained by heating zinc di-nonylphosphorodithioate with 0.25 mole of 1.2-hexene oxide at 120° C., a sulfurized methyl ester of tall oil acid having a sulfur content of 15%, 6% of a polyisobutene (M.W.-80,000) viscosity index improver, 0.005% of a poly-(alkylmethacrylate) anti-foam agent, 0.5% of lard oil, and 1.5% of the reaction product of a polyisobutene (molecular weight-1000)-substituted succinic anhydride and a commerical mixture of polyalkylene polyamines reacted in a 1:1 ratio of equivalents of acid to amine as disclosed in U.S. Patent 3,219,666.

Composition C

SAE 80 mineral lubricating oil containing 2% of an ashless dispersant prepared as in Composition B above, 1% of the product of Example VIII, 0.1% of phosphorus as zinc di-n-hexylphosphorodithioate, 10% of a chlorinated paraffin wax having a chlorine content of 40%, 2% of di-butyltetrasulfide, 2% of sulfurized dipentene, 0.2% of oleylamide, 0.003% of an anti-foam agent, 0.02% of a pour point depressant, and 3% of a viscosity index improver such as polyisobutylene (molecular weight 100,000).

Composition D

SAE 50 mineral lubricating oil containing 5% of the product of Example I.

The foregoing compositions are merely illustrative of the many varied lubricating oil compositions in which the reaction products of the present invention can be employed. It should be understood that the reaction products of the present invention are not limited to use in mineral oil-based lubricating compositions. Other lubricating oils, natural as well as synthetic, can be used as the base of the lubricating oil and grease compositions. Such natural and synthetic bases include hydrocarbon oils derived from polymerization of olefins and synthetic oils produced from alkylene oxides such as polyethylene oxide and polypropylene oxide polymers or the esters and ethers thereof. The synthetic ester oils such as those produced from polycarboxylic acids and alcohols, including glycols and polyglycols, are also contemplated as being within the scope of the present invention. Exemplary of these oils are dibutyl adipate, di-(2-ethylhexyl)-sebacate, dilauryl azelate, etc.

In addition, the reaction products of the present invention can be mixed with lower aliphatic carboxylic acids such as acetic acid, water, alkanols of up to about eight carbon atoms, alkanol-water mixtures, lower aliphatic carboxylic acid-water mixtures, and the like to form grease-like gels following the procedure set forth in detail in U.S. Patent 3,242,079. The resulting greases are themselves useful lubricants and lubricating additives as are the greases of the patent. In addition, the greases are useful as additives in resinous compositions, particulraly as lubricant additives for resinous compositions where they function as extrusion aids and thixotropic agents. They are especialy useful as additives for extrudable polyvinyl chloride resins. When used as resin additives, they should be incorporated into the resinous mixture in amounts of from about 0.05% to about 10% and, preferably, about 0.25% to about 5% by weight, of the resinous composition.

The products prepared from molybdenum-containing anions are also useful as antiwear and extreme pressure additives (E.P. agents) in lubricating oil compositions when employed in amounts that provide the lubricant with a molybdenum content of about 0.05% to about 5% by weight. These molybdenum-containing products are particulraly effective when employed in combination with one or more known antiwear and/or E.P. agents.

What is claimed is:

1. A method comprising contacting, at a temperature of at least about 20° C., (a) anions of at least one inorganic acid and at least one (b) basic, carbonated alkaline earth metal-containing complex of a condensation product of lower aliphatic aldehyde and alkylene polyamine for a period of time sufficient for at least a portion of the anions to react with alkaline earth metal, the ratio of equivalents of alkaline earth metal present in the complex to the equivalents of anion being from about 1:0.01 to about 1:5.

2. A method according to claim 1 wherein the anions are derived from inorganic acids and the ammonium, amine, and metal salts thereof, and inorganic acidic gases.

3. A method according to claim 1 wherein the inorganic acids are selected from inorganic oxy acids and the ammonium salts thereof.

4. A method according to claim 1 wherein the complex is a basic, carbonated, barium complex.

5. A method according to claim 2 wherein the complex is a basic, carbonated barium complex.

6. A method comprising contacting, at a temperature of at least about 20° C., (a) anions derived from at least one member selected from the group consisting of inorganic acids, the ammonium and metal salts thereof, and inorganic acidic gases with at least one (b) basic, carbonated alkaline earth metal-containing complex of a condensation product of a lower alipahtic aldehyde and an N-alkyl alkylene polyamine having two to about 10 amino nitrogen atoms, from about 8 to about 40 carbon atoms in the alkyl group, and 2 to 4 carbon atoms in the alkylene groups, said complex being in solution in an organic liquid, and maintaining the contact between the anions and the complex for a sufficient period of time for at least a portion of the anions to react with alkaline earth metal, the ratio of equivalents of alkaline earth metal present in the complex to the equivalents of anion being from about 1:01 to about 1:3.

7. A method according to claim 6 wherein the organic liquid is selected from (1) mineral oil and (2) mixtures of mineral oil and at least one other substantially inert organic liquid wherein the weight ratio of oil to inert organic liquid is about 1:20 to about 20:1.

8. A method according to claim 7 wherein the basic carbonated, alkaline earth metal-containing complex is a barium complex.

9. A method according to claim 8 wherein the inorganic acid is an inorganic oxy acid or ammonium salt thereof.

10. A method according to claim 9 wherein an aqueous solution of inorganic acid is employed as a source of anions.

11. A method according to claim 10 wherein the condensation product is prepared from formaldehyde or a formaldehyde-producing material.

12. A method according to claim 11 wherein the basic, carbonated complex is a basic, carbonated barium complex.

13. A method according to claim 12 wherein the N-alkyl alkylene polyamine is an N-alkyl alkylene diamine wherein the alkyl group contains from about 10 to 30 carbon atoms.

14. A method according to claim 13 wherein the said diamine is N-octadecyl propylenediamine.

15. A method according to claim 6 wherein said basic, carbonated alkaline earth metal-containing complex is produced by the process comprising carbonating a mixture comprising:
(A) mineral oil;
(B) a phenolic composition consisting of a mixture of at least one alkylated phenol having from about 6 to about 200 aliphatic carbon atoms and at least one oil-soluable condensation product of formaldehyde and N-alkyl alkylenediamine having from about 12 to about 30 carbon atoms in the alkyl radical and from 2 to 4 carbon atoms in the alkylene radical wherein the ratio of equivalents of alkylated phenol to the condensation product is within the range of from about 0.1:1 to 10:1; and
(C) at least one member selected from the class consisting of barium hydroxide, barium oxide, or mixtures thereof,
the ratio of equivalents of barium to the total number of equivalents of condensation product and promoter in said phenolic composition being from about 2:1 to about 15:1.

16. A method according to claim 11 wherein the basic, carbonated barium complex is prepared by carbonating a mixture comprising:
(A) mineral oil;
(B) a phenolic composition consisting essentially of a mixture of heptylphenol and the condensation product of about 3.5 moles of formaldehyde and about 1 mole of N-octadecyl trimethylenediamine, wherein the ratio of equivalents of the heptylphenol to the condensation product is within the range of from about 0.5:1 to about 5:1;
(C) at least one member selected from the class consisting of barium hydroxide, barium oxide or mixtures thereof,
the ratio of equivalents of barium to the total number of equivalents in said phenolic composition being from about 2:1 to about 15:1.

17. The composition produced by the process of claim 1.

18. The composition produced by the process of claim 6.

19. The composition produced by the process of claim 15.

20. The composition produced by the process of claim 16.

References Cited

UNITED STATES PATENTS

| | | | |
|---|---|---|---|
| 2,616,906 | 11/1952 | Asseff et al. | 252—39 X |
| 2,695,910 | 11/1954 | Asseff et al. | 44—70 X |
| 2,989,463 | 6/1961 | Mastin | 252—42.7 X |
| 3,372,118 | 3/1968 | Rense | 252—25 X |

DANIEL E. WYMAN, *Primary Examiner.*

W. J. SHINE, *Assistant Examiner.*

U.S. Cl. X.R.

44—51, 57, 72; 252—18, 25

PO-1050
(5/69)

UNITED STATES PATENT OFFICE
CERTIFICATE OF CORRECTION

Patent No. 3,453,212      Dated July 1, 1969

Inventor(s) Casper J. Dorer, Jr.

It is certified that error appears in the above-identified patent and that said Letters Patent are hereby corrected as shown below:

Column 17, line 26, "10 to 30 carbon atoms" should read --10 to about 30 carbon atoms--.

Signed and sealed this 3rd day of August 1971.

(SEAL)
Attest:

EDWARD M. FLETCHER, JR.
Attesting Officer

WILLIAM E. SCHUYLER, JR.
Commissioner of Patents